United States Patent [19]

Kikinis

[11] Patent Number: 5,613,906
[45] Date of Patent: Mar. 25, 1997

[54] METHOD AND APPARATUS FOR WASTE HEAT REMOVAL FROM A COMPUTER ENCLOSURE

[75] Inventor: Dan Kikinis, Saratoga, Calif.

[73] Assignee: Elonex I.P. Holdings, Ltd., London, England

[21] Appl. No.: 504,886

[22] Filed: Jul. 20, 1995

[51] Int. Cl.$^6$ .................................................. H05K 7/20
[52] U.S. Cl. .......................... 454/184; 361/678; 361/695
[58] Field of Search ............................ 165/122; 361/678, 361/691, 692, 695; 454/184

[56] References Cited

U.S. PATENT DOCUMENTS

| | | | |
|---|---|---|---|
| 3,039,377 | 6/1962 | Wernli | 454/184 |
| 4,356,531 | 10/1982 | Marino et al. | 361/695 X |
| 4,931,904 | 6/1990 | Yiu | 361/695 |
| 5,287,009 | 2/1994 | Heung | 361/695 X |
| 5,412,534 | 2/1995 | Cutts et al. | 361/695 |
| 5,456,632 | 10/1995 | Ohtsu et al. | 454/184 |

FOREIGN PATENT DOCUMENTS

| | | | |
|---|---|---|---|
| 4-163996 | 6/1992 | Japan | 361/692 |
| 6-132434 | 5/1994 | Japan | 361/695 |
| 88/01013 | 11/1988 | WIPO | 361/695 |

*Primary Examiner*—Harold Joyce
*Attorney, Agent, or Firm*—Donald R. Boys

[57] ABSTRACT

A hot-air chimney for a computer in an enclosure, for the purpose of removing hot air generated by ICs within the enclosure, is fabricated in the shape and form of an expansion card for the computer. The chimney has a base panel in the shape of the expansion card, and an enclosed passage formed on the base panel. The chimney also has an end flange fashioned to simulate an end panel of the expansion card, and the enclosed passage is open to an opening in the end flange. In computers wherein expansion cards are installed parallel to and overlying a motherboard, the hot-air chimney is installed in place of an expansion card adjacent to the motherboard. An opening positioned in the base panel into the enclosed passage, and positioned to overlie a heat-producing IC on the motherboard, conducts heated air from the IC into the enclosed package and then outside the enclosure via the opening in the end flange. The chimney is particularly effective for computers with fan-mounted ICs, such as a CPU with a cooling fan. In some embodiments an EMI-grounding grid is provided over the opening in the end flange of the hot-air chimney.

13 Claims, 3 Drawing Sheets

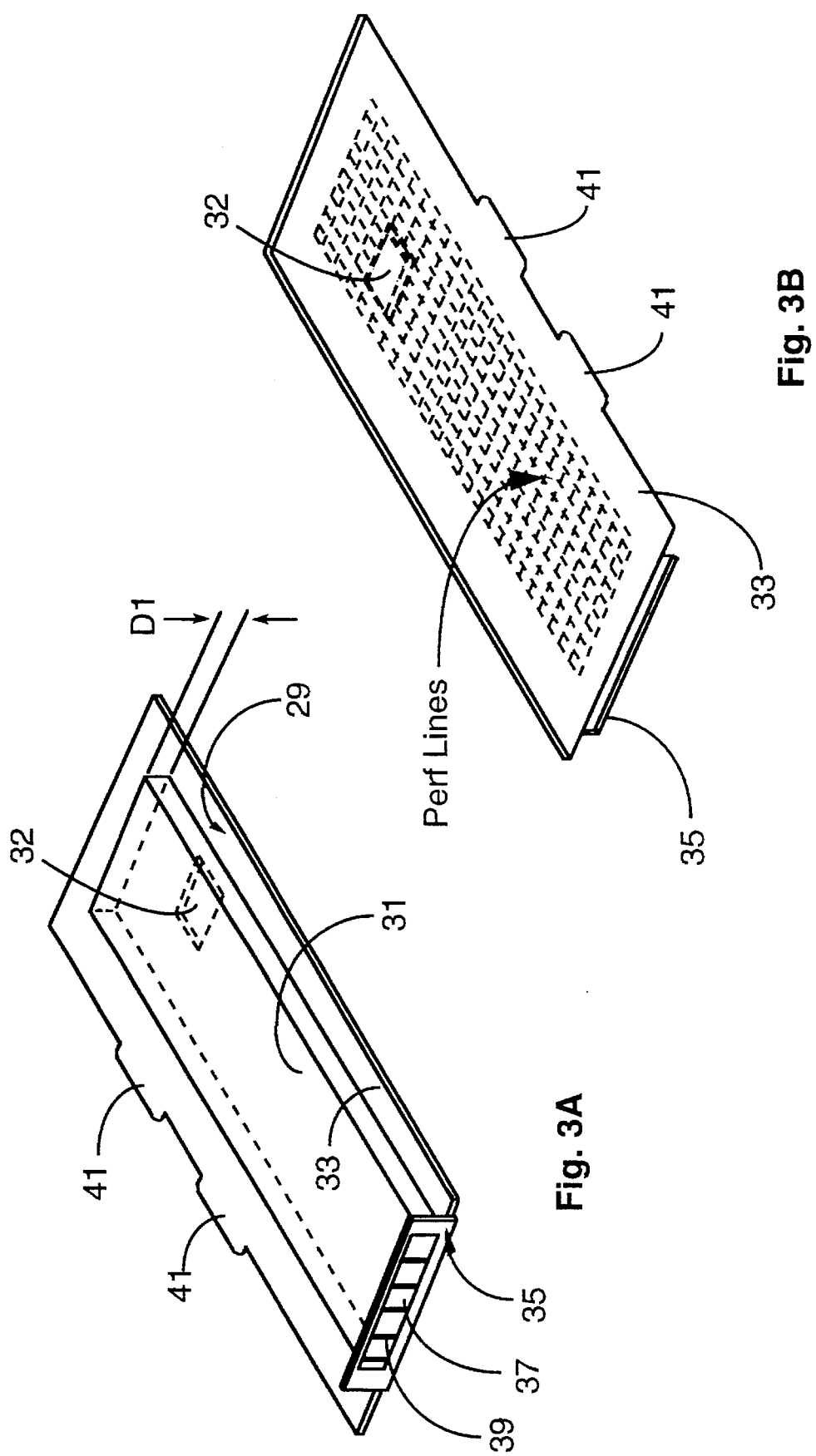

METHOD AND APPARATUS FOR WASTE HEAT REMOVAL FROM A COMPUTER ENCLOSURE

FIELD OF INVENTION

The present invention is in the area of personal computers, such as desk-top computers, and pertains in particular to methods and apparatus for dispensing with waste heat generated by integrated circuits (ICs) inside computer enclosures.

BACKGROUND OF THE INVENTION

In current art, integrated circuits (ICs) are building blocks for most electronic circuitry. IC technology has grown from single transistor devices to an art wherein single ICs may have more than a million circuits. Similarly, operating frequencies of microcircuits have increased to 100 megahertz and more. This growth in IC density and speed has benefitted users through development of increasingly smaller, faster, more capable, and more portable electronic equipment.

Increased capability in integrated circuits, however, comes with an inherent disadvantage in that the denser and faster ICs operate hotter than less powerful ICs. ICs, like most other electrical devices, consume electrical power and dissipate much of the power as heat. Higher circuit densities and higher operating speeds cause an IC to consume greater amounts of power and dissipate greater amounts of heat. This phenomenon is particularly true for state-of-the-art microprocessor CPUs, which may dissipate 30 to 50 watts. Recent experience in using such microprocessor CPUs as the Intel Pentium™, for example, has emphasized the need for heat removal.

A particular problem with hot ICs is that electrical properties of silicon devices change appreciably with temperature. For proper operation and reasonable service life, waste heat must be removed to keep ICs and surrounding structure and devices within safe operating temperatures.

Mounting and assembly constraints under which ICs are typically utilized serve to exacerbate the problem of heat removal. A premier use of microprocessor ICs, for example, is as central processing units (CPUs) for personal computers. These microprocessor IC's are typically mounted to a motherboard and are surrounded, in the same enclosure, by a variety of components, such as a power supply, disk drives, disk controllers, basic input/output system (BIOS), random access memory (RAM), video display adapter, small computer system interfaces (SCSI), and other heat-generating components commonly found in personal computers.

In recognition of the problem of heat generated by ICs, high-powered microprocessor CPUs often are provided on a motherboard with a fan apparatus that draws in surrounding air, passes the air at relatively high velocity over surfaces of the CPU package, and expels heated air into the immediate surroundings, that is, the unused volume within the enclosure of the personal computer. Fans for this purpose are available commercially, and may be added by a user to microprocessor CPUs and other ICs. Such fan apparatus has proven successful in its immediate purpose, which is to cause the directly-effected IC to run cooler.

The solution of fan-cooling an IC such as a microprocessor CPU creates a new problem. Expelling heated air from a microprocessor IC into the immediate surroundings within an enclosure of a personal computer raises the ambient temperature in the computer enclosure, which risks effective operation and life of many surrounding components in the computer enclosure.

In tests performed on conventional computers in conjunction with the present invention, ambient temperature in a personal computer enclosure, having a high-powered microprocessor IC with a fan, was measured at about 20 degrees C. with the computer not operating. After a few minutes with the microprocessor CPU and its fan operating normally, the air temperature within the personal computer enclosure rose to over 44 degrees C.

What is clearly needed is a method and apparatus that keeps a microprocessor IC operating within a specified safe temperature range without raising the temperature of the volume of air within a personal computer enclosure.

SUMMARY OF THE INVENTION

In a preferred embodiment of the present invention, a hot-air chimney is provided to be used with a computer. The hot-air chimney comprises a base panel shaped as an expansion card for the computer; an end flange attached to the base panel in the position of an end panel for the expansion card, the end flange having an opening; and an enclosed passage formed on the base panel. The passage is closed on one end and open to the opening in the end flange. The base panel in one embodiment forms one wall of the enclosed passage.

Also in a preferred embodiment the end flange is configured to fasten to an expansion card opening in the computer, and in some embodiments the base panel further comprises an edge connector shape simulating an edge connector on the expansion card. The base panel in various embodiments of the present invention comprises one or more openings into the enclosed passage positioned for particular computer motherboards, so the openings, with the chimney installed, overlie heat-producing ICs.

In some embodiments, the base panel of the chimney is formed of a paper-like material having scores or perforation lines, such that removing a section of the base panel defined by individual ones of the scores or perforation lines will form an opening through the base panel into the enclosed passage. Where required for EMI interference reduction, chimneys according to embodiments of the invention have an EMI-grounding grid formed over the opening through the end flange.

A computer is provided according to the invention with a hot-air chimney formed in the shape and form factor of an expansion card for the computer, and a method is provided according to the invention for removing waste heat from a computer enclosure by installing a chimney according to an embodiment of the invention.

The hot-air chimney provided by the present invention provides an ability to conduct waste heat outside a computer enclosure without having to form a new opening in the enclosure, and without having to provide special mounting and support structure for the chimney. Chimneys according to embodiments of the invention utilize existing openings otherwise intended for expansion cards, and also utilize existing support structure also otherwise intended for expansion cards.

BRIEF DESCRIPTION OF THE DRAWINGS

FIG. 3A is an isometric view of the hot-air chimney of FIG. 2.

FIG. 3B is an isometric view of the hot-air chimney of FIG. 3A, from a vantage showing the underside of the chimney.

DESCRIPTION OF PREFERRED EMBODIMENTS

In the present invention, a solution to the problem of heating air in a computer, particularly wherein an IC is equipped with a cooling fan is provided by funneling the heated air away from the IC, using a unique chimney apparatus, to the outside of a CPU enclosure. In tests performed using chimneys according to embodiments of the present invention, the same computer enclosure that showed a 44 degree C. internal air temperature with a fan-cooled CPU operating without a chimney, showed an internal temperature of 20 degrees C. operating with a chimney according to the present invention. 20 degrees C. is the temperature exhibited when the CPU and fan are not running at all.

Providing a chimney for a fan-cooled IC is not a simple problem. The problem is larger than it appears for the following reasons: To be really useful, a chimney for the purpose intended needs to be applicable to existing personal computers without time-consuming and expensive procedures of insatlling special mountings and providing a special opening through the computer's enclosure walls.

There is not a lot of room inside most personal computers for a chimney interfaced to a fan-cooled CPU or other IC. Also, there is no extra opening to the outside of a personal computer enclosure just for the purpose of installing a chimney. Finally, even if there were a convenient opening, the opening would need some protection to ensure electromagnetic interference (EMI) integrity of the enclosure.

In the present invention, a unique and inventive answer to this problem lies in the typical location of a motherboard with a fan-mounted CPU or other IC in a computer architecture, together with a typical arrangement of expansion slots and openings provided for expansion boards.

Figure 1:
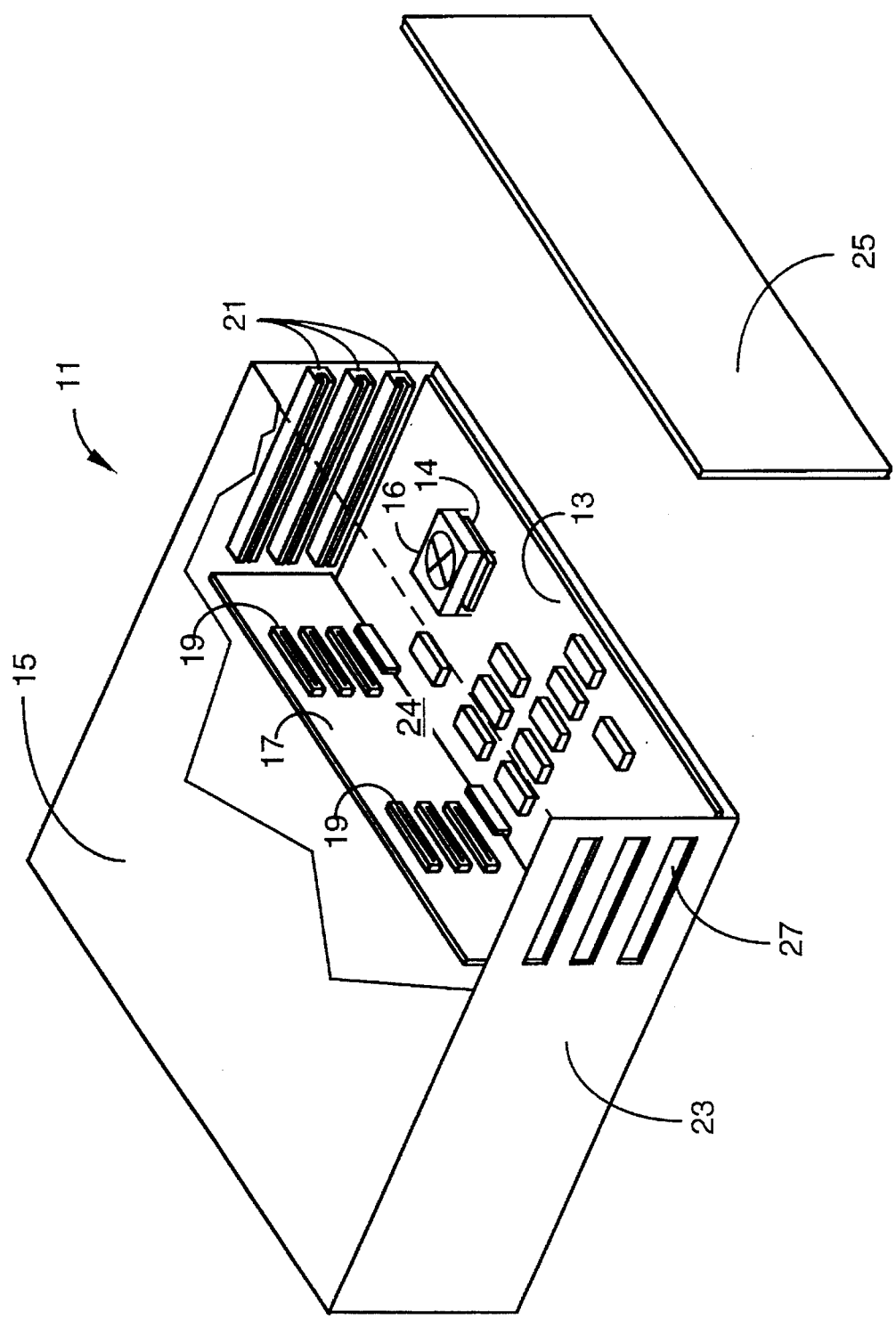
FIG. 1 is a cutaway isometric view of a representative personal computer according to current art, wherein expansion boards are assembled parallel to a motherboard.

FIG. 1 is an isometric view of a representative personal computer 11 according to current art. Personal computer 11 has a motherboard 13 mounted near the bottom and along one side of enclosure 15. Motherboard 13 has a high-powered CPU 14 with a fan 16 that expels air upward and away into ambient air volume 24, drawing air at the level of the motherboard from four sides across CPU 14.

Enclosure 15 is shown partially cut away to reveal elements and structure inside the computer enclosure. An upright printed circuit board 17, mounted and connected by edge connectors to motherboard 13 at a right angle, provides edge connectors such as connector 19, for engaging and positioning expansion boards (cards), providing for expansion peripherals to be mounted to a system bus of computer 11. The architecture of FIG. 1 is common in the art, and typically includes guides 21 for engaging and guiding expansion cards into engagement with edge connectors 19.

Wall 23 is the back wall of computer 11, and side panel 25 is shown removed to expose inner elements for the present description. Back wall 23 typically includes, as is well known in the art, rectangular openings 27 for access to connectors from expansion cards. Although openings 27 are shown as open in FIG. 1, each expansion position with no expansion card installed typically has a dummy panel attached to cover opening 27, providing dust protection and EMI integrity for the computer enclosure.

As is also well known in the art, installed expansion cards have end panels which attach to the enclosure to fill opening 27 and to provide one or more connectors from electronic elements on the expansion card to the outside of the enclosure. A modem expansion card, for example, will have at least one telephone jack in an end panel.

Figure 2:
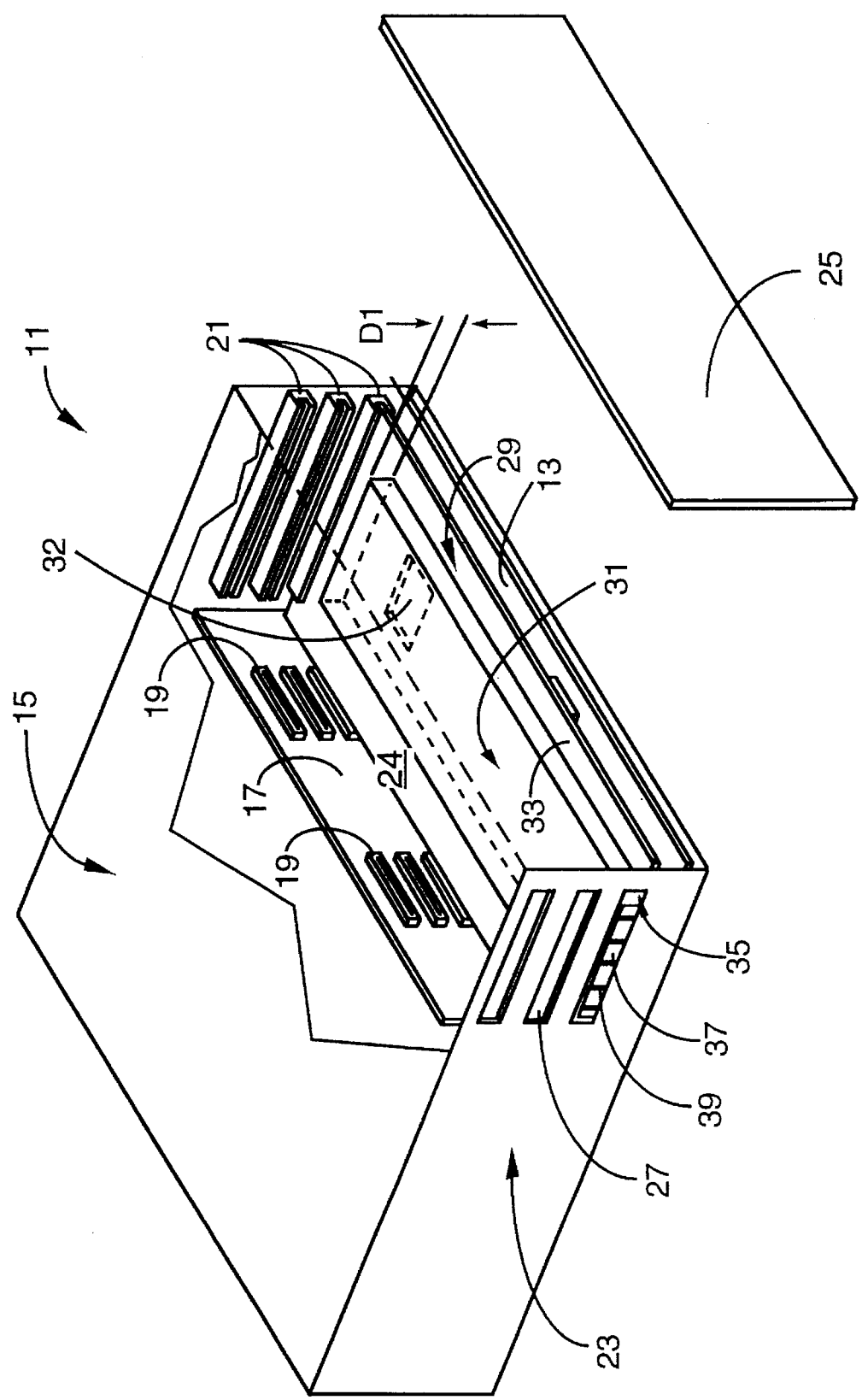
FIG. 2 is an isometric view of the personal computer of FIG. 1, including a hot-air chimney according to an embodiment of the present invention.

FIG. 2 is an isometric view of personal computer system 11 of FIG. 1 equipped with a chimney card 29 according to the present invention. Chimney card 29 provides a path for heated air from CPU 14 accelerated by fan 16 to the exterior of enclosure 11. Chimney card 29 is configured as a pseudo expansion card, and is installed in the lowest of the three expansion card positions shown.

Chimney card 29 in this embodiment is a construction of fire resistant and electrically insulating panels which provide an enclosed rectangular passage 31 with a central axis in the front-to-back direction relative to enclosure 15. One material suitable for chimney card 29 is Fastex™, made by Fastex Division of the Illinois Tool Works, Inc. of Des Plaines, Ill. Fastex is available in several grades, some of which have other names, and is generally fire resistant, UL approved, and is also electrically insulating.

Enclosed chimney passage 31 is constructed on a base panel 33, also made of fireproof and electrically insulating material. Panel 33 is shaped to the standard outline of an expansion card for the particular architecture shown, and the overall height D1 of chimney 29 is within the height for such an expansion card. Panel 33 includes edge connector simulation shapes. Chimney 29 may thus be engaged in guides 21 and also in edge connectors 19.

Chimney card 29 is configured to facilitate cutting an opening 32 at a position to overlie CPU 14 and fan 16 when card 29 is installed, to direct expelled heated air from fan 16 into passage 31. Chimney 29 is provided at one end with an end panel 35 having an opening into passage 31, and the metal panel is positioned to fasten to enclosure 15 just as similar panels fasten in the case of conventional expansion cards. In this case, panel 35 has an opening 37 of the size of passage 31, and the opening has a grid, composed of wires 39, which provides EMI grounding at the panel for the opening.

FIG. 3A is an isometric view of chimney card 29 not installed in a computer, and in the same orientation as shown in FIG. 2. Passage 31; panel 33, and end panel 35 are clearly indicated, and edge connector simulation shapes 41 are provided in the position of edge connectors on a conventional expansion card for engagement in edge connectors 19 (FIG. 2). The position of opening 32 on chimney 29 is exemplary as shown, and the opening could be provided wherever needed and of different size to accommodate differently positioned CPUs and other ICs on a motherboard.

FIG. 3B is an isometric view of chimney 29 from a different vantage than that of FIG. 3A, so the underside of the chinmey card may be seen; that is, the side that will be closer to motherboard 13 in FIG. 2. Panel 33, in the area immediately underlying passage 31 in this embodiment, has perforation lines in about a one-quarter inch grid, allowing opening 32 to be fashioned quickly and easily at any position necessary to overlie a CPU or other IC on a motherboard. This perforation grid allows chimney cards, according to embodiments of the present invention, to be customized so an opening 32 can be cut to overlie a CPU or other IC, wherever mounted on a motherboard, according to a variety of personal computer component configurations known in current art.

It will be apparent to those with skill in the art that there are many alterations that might be made in details in embodiments of the invention described above without departing from the spirit and scope of the invention. For example, passage 31 and panel 33 can be made from any one of several materials known in the art, with the stipulation that fire resistance and dielectric strength are desirable characteristics. It is also desirable that the material of construction be sturdy enough to allow edge connector simulation shapes to be inserted into connectors 19 on upright printed circuit board 17. Furthermore, passage 31, panel 33, and end panel 35 can be assembled in a number of different ways, such as by adhesive bonding, screws, rivets, staples, and so on. There are similarly a number of different ways a passage for air may be implemented on a base panel, such as by molding for example.

As another example, only one opening 32 for CPU 14 and fan 16 is described above as convenient for illustration. The invention can accommodate openings for additional components, such as a math co-processor IC with a cooling fan, or for fan-cooled parallel processors in other architectures. Furthermore, although a CPU 14 and fan 16 is described above as a primary heat-generating source inside a personal computer, in fact, the invention is applicable to any component expelling heated air into a personal computer enclosure. The chimney works best with a fan expelling air into an inlet opening of the chimney, as described above, but the chimney is also useful for ICs that have no mounted fan. Heated air from an IC without a fan may be conducted outside a computer enclosure by means of to convection.

What is claimed is:

1. A hot-air chimney for a computer, comprising:
   a base panel in the shape of an expansion card for the computer;
   an end flange attached to the base panel in the position of an end flange for the expansion card, the end flange having an opening therein; and
   an enclosed passage formed on the base panel, the passage closed on the end opposite the end flange and open to the opening in the end flange.

2. A hot-air chimney as in claim 1 wherein the base panel forms one wall of the enclosed passage.

3. A hot-air chimney as in claim 1 wherein the end flange is configured to fasten to an opening for an expansion card in the computer.

4. A hot-air chimney as in claim 1 wherein the base panel further comprises an edge connector shape simulating an edge connector on the expansion card.

5. A hot-air chimney as in claim 1 wherein the base panel comprises one or more openings therethrough into the enclosed passage.

6. A hot-air chimney as in claim 1 wherein the base panel has a pattern of scores or perforation lines, such that removing a section of the base panel defined by individual ones of the scores or perforation lines will form an opening through the base panel into the enclosed passage.

7. A hot-air chimney as in claim 1 further comprising an EMI-grounding grid formed over the opening through the end flange.

8. A computer, comprising:
   a motherboard having a heat-producing IC thereon; and
   a hot-air chimney installed in an expansion slot over the motherboard;
   wherein the hot-air chimney comprises a base panel in the shape of an expansion card for the computer, an end flange attached to the base panel in the position of an end panel for the expansion card, and an enclosed passage formed on the base panel, the passage closed on the end opposite the end flange and open to a first opening in the end flange, and wherein the base panel has a second opening substantially over the position of the heat-producing IC.

9. A computer as in claim 8 wherein the end flange of the hot-air chimney is configured to fasten to an expansion card opening in the computer.

10. A computer as in claim 8 wherein base panel engages one or more female expansion slot edge connectors of the computer.

11. A computer as in claim 8 wherein the base panel has a pattern of scores or perforation lines, and the second opening is provided by cutting the base panel along individual ones of the scores or perforation lines.

12. A computer as in claim 8 further comprising an EMI-grounding grid formed over the first opening.

13. A computer as in claim 8 wherein the heat-producing IC is a microprocessor CPU having a fan mounted thereto.

* * * * *